S. L. SKINNER.
Safety Car-Truck.

No. 223,957. Patented Jan. 27, 1880.

WITNESSES:
C. Neveux
C. Sedgwick

INVENTOR:
S. L. Skinner
BY Munn & Co
ATTORNEYS.

N. PETERS, PHOTO-LITHOGRAPHER, WASHINGTON, D. C.

UNITED STATES PATENT OFFICE.

SAMUEL L. SKINNER, OF INDEPENDENCE, IOWA.

SAFETY CAR-TRUCK.

SPECIFICATION forming part of Letters Patent No. 223,957, dated January 27, 1880.

Application filed November 14, 1879.

*To all whom it may concern:*

Be it known that I, SAMUEL L. SKINNER, of Independence, in the county of Buchanan and State of Iowa, have invented a new and Improved Safety Car-Truck, of which the following is a specification.

Figure 1:
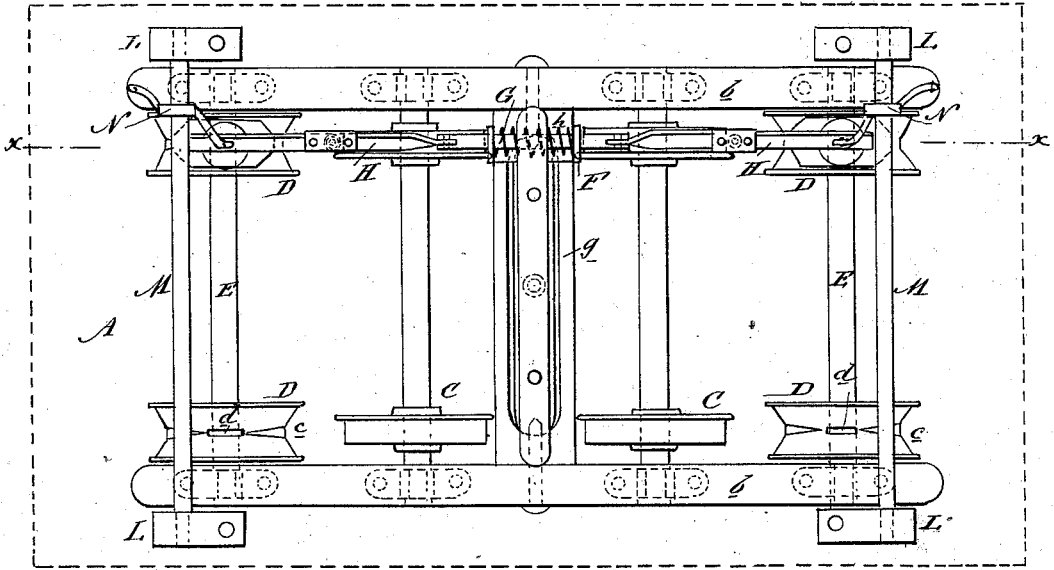
Figure 2:
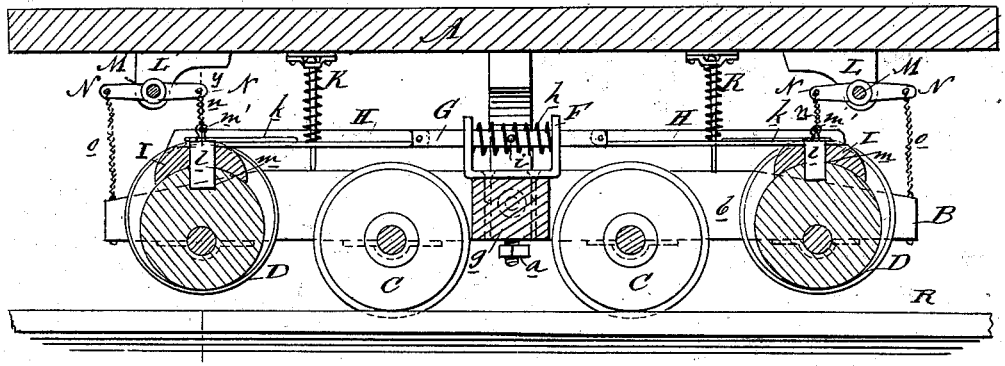
Figures 3, 4:
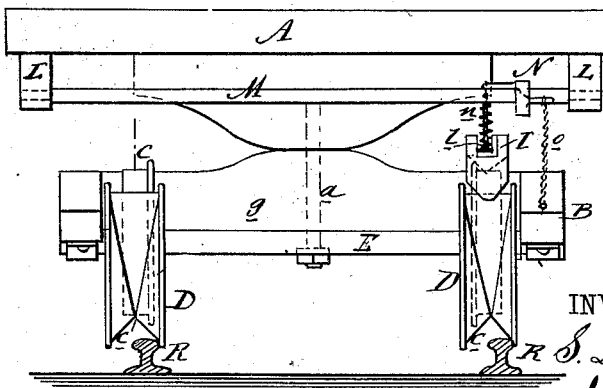

Figure 1 is a plan of the truck, the car-bottom being removed. Fig. 2 is a sectional side elevation of the same on line $xx$, Fig. 1, shown attached to the bottom of a car. Fig. 3 is an end elevation of the same. Fig. 4 is a vertical sectional elevation of a safety-wheel on line $yy$, Fig. 2.

Similar letters of reference indicate corresponding parts.

The object of this invention is to provide a device for automatically restoring to their proper position, while the cars are running, the car-wheels that may chance to run off the track because of a misplaced switch or other cause.

The invention consists of eccentric wheels with V-shaped grooves in their treads, adjusted on a car-truck and operated by brake-shoes, dogs, rods, springs, and chains, all of which are hereinafter described, in such a manner that when a car wheel or wheels leave the rails the said eccentric wheels will at once drop upon the rails and operate to raise the truck in line again, so that the car wheel or wheels will be restored to their proper position.

In the drawings, A represents a car-bottom, to which the truck B is held by a bolt, $a$. C represents the ordinary car wheels and axles, journaled in the sides $b$ of the truck B. D D are the eccentric safety-wheels, secured on axles E E, that are journaled, as are the wheels C, on the sides $b$ of the truck. These safety-wheels D D are three or four times, or thereabout, wider than the car-wheels C, and their treads are made with a V-shaped groove, $c$, as shown, at the point where the socket $d$ is indicated, and for a short distance either side of the said socket $d$, from which points the depth of the groove $c$ gradually decreases circumferentially in both directions to the opposite points in the tread, where the tread becomes broad and flat, as shown at $f$.

Fastened upon the cross-beam $g$ of the truck B is a double standard, F, through eyes in which the rod G is passed horizontally, and around that portion of this rod G which lies between the vertical arms of the standard F is fixed a spring, $h$, which is held in a proper relative position to the rod G by the pin $i$. To either end of this rod G is pivoted an angle-iron, H, that carries on its outer end a brake-shoe, I.

Fastened on these angle-irons H are the springs $k$, which carry on their free ends, or press with their free ends on, the dogs $l$, that are held in the sockets $m$ of the brake-shoes I, and project downward into the sockets $d$ of the safety-wheels D D when the said wheels D D are in the position shown in Fig. 2. From the car-bottom A the rods and springs K project downward, the ends of the rods passing through the angle-irons H to hold and press the brake-shoes I and dogs $l$ constantly upon and into the safety-wheels D D, in order to hold the said wheels D in the position shown in Fig. 2 while the car-wheels C are running on the rails.

Journaled in lugs L, that are secured to the car-bottom A, are the two transverse rods M, on which are centrally keyed or otherwise fastened the crank-arms N. The inner ends of these levers or crank-arms N are connected with the eyes $m$ of the dogs $l$ by the chains $n$, while the outer ends of the said levers N are connected by the chains $o$ to the ends of a side, $b$, of the truck B. In their normal position, as shown in Fig. 2, the safety-wheels D D are held by the dogs $l$ with their treads several inches above the rails R; but should the wheels C run off the rails R the ends of the truck B would instantly drop, and by so doing would pull down on the chains $o$, and thereby cause, by means of the levers N, the chains $n$ to pull the dogs $l$ from the sockets $d$ of the safety-wheels D D, so that the slotted and deeply-grooved portion of treads of these wheels D D will at once drop upon the rails, as shown in Fig. 3, thus elevating the truck B, and, by the inclination of the inclined faces of the grooves $c$, forcing the said truck B and the wheels C C in line again as they revolve; and as these safety-wheels D D revolve the truck B becomes lowered as the flatter parts of the wheel-treads come upon the rails until the wheels C C rest again in their proper position upon the rails R. Then the slots or sockets $d$ of the said safety-wheels D D having come uppermost, the dogs *l* will be forced into them by the action of the springs K to hold them (the wheels D D) in their primary position.

The withdrawal of the dogs *l* from the sockets *d* of the safety-wheels D D and the consequent dropping of the said wheels so instantaneously follows the displacing of the wheels C C from the rails that it is hardly possible for a car to gain enough lateral movement in the intermediate time to prevent the treads of the wheels D D from striking the tops of the rails, especially as the said treads are purposely made very wide, and it is evident that the inclined planes of the treads must, when the car is in motion, serve as most effective levers for restoring the car to its proper position.

Another safety-wheel designed by me as an equivalent to the one herein shown has a broad slotted side flange, in which slot a dog engages to hold the wheel up; and still another wheel of my design is provided with a lug on the side and held by a dog or latch that is attached to the side of the car.

Having thus described my invention, I claim as new and desire to secure by Letters Patent—

1. The safety-wheels D, constructed with a combined grooved and flat tread and a socket, *d*, and fixed eccentrically upon the shafts E, substantially as herein shown, and for the purpose described.

2. The eccentric safety-wheels D, provided with socket *d*, in combination with the truck B, axles E, rod G, angle-irons H, brake-shoes I, provided with sockets *m*, springs *k*, and dogs *l*, substantially as herein shown and described.

3. The truck B, safety-wheels D, axles E, rods M, crank-arms N, chains *n o*, and dogs *l*, in combination, substantially as shown and described.

4. The rods and springs K, angle-irons H, and springs *k*, in combination with the brake-shoes I and dogs *l*, substantially as herein shown and described, whereby the said shoes and dogs are pressed upon the safety-wheels D, as set forth.

5. The combination of safety-wheels D, provided with sockets *d*, with socketed brake-shoes I and dogs *l*, substantially as herein shown and described.

SAMUEL LAWRENCE SKINNER.

Witnesses:
W. G. DONNAN,
H. SPRAGG.